US010171662B1

(12) United States Patent
Zhou et al.

(10) Patent No.: US 10,171,662 B1
(45) Date of Patent: Jan. 1, 2019

(54) INTERVENTION IN CONVERSATION BETWEEN VIRTUAL AGENT AND USER

(71) Applicant: INTERNATIONAL BUSINESS MACHINES CORPORATION, Armonk, NY (US)

(72) Inventors: Xin Zhou, Beiing (CN); Li Jun Mei, Beijing (CN); Qi Cheng Li, Beijing (CN); Hao Chen, Beijing (CN); Jian Wang, Beijing (CN); Shao Chun Li, Beijing (CN); Yi Peng Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/712,671

(22) Filed: Sep. 22, 2017

(51) Int. Cl.
| *H04M 3/00* | (2006.01) |
| *H04M 3/51* | (2006.01) |
| *G06Q 10/06* | (2012.01) |
| *G10L 25/63* | (2013.01) |
| *H04L 12/18* | (2006.01) |
| *H04L 12/58* | (2006.01) |
| *G06Q 30/00* | (2012.01) |

(52) U.S. Cl.
CPC ...... *H04M 3/5175* (2013.01); *G06Q 10/0635* (2013.01); *G10L 25/63* (2013.01); *H04L 12/1831* (2013.01); *H04L 51/02* (2013.01); *H04M 3/5166* (2013.01); *G06Q 30/016* (2013.01)

(58) Field of Classification Search
CPC .......................... H04M 3/5175; G06Q 10/0635
USPC ....... 379/265.01–265.14, 266.01–266.1, 309
See application file for complete search history.

(56) References Cited

U.S. PATENT DOCUMENTS 9,559,993 B2  1/2017 Palakovich et al.
9,621,728 B2  4/2017 McCormack et al.
(Continued)

FOREIGN PATENT DOCUMENTS

CN    105577529 A    5/2016
WO      0209399 A2   1/2002

OTHER PUBLICATIONS

Botpress, "Human in the Loop for Enterprise Bots," https://botpress.io/blog/human-in-the-loop-for-enterprise-bots/ , Jun. 5, 2017, Published by Ghost, Copyright Blog 2017, Printed on Sep. 20, 2017, pp. 1-7.

(Continued)

*Primary Examiner* — William Deane, Jr.
(74) *Attorney, Agent, or Firm* — Dmitry Paskalov

(57) ABSTRACT

A computer-implemented method, apparatus, computer program product for intervention in a conversation between a virtual agent and a user is disclosed. In the computer-implemented method, a risk level of the conversation is evaluated. In response to the risk level being higher than a threshold, it is indicated that the conversation needs an intervention by a human agent. In response to the human agent intervening in the conversation, the conversation is handed over from the virtual agent to the human agent. Then, a simulative conversation is generated according to the conversation between the user and the human agent. In response to a determination by the human agent based on the simulative conversation, the conversation is handed over from the human agent to the virtual agent.

16 Claims, 7 Drawing Sheets

(56) References Cited

U.S. PATENT DOCUMENTS

| | | | |
|---|---|---|---|
| 2011/0141919 A1* | 6/2011 | Singh ................. | H04L 41/0681 370/252 |
| 2012/0076279 A1* | 3/2012 | Vasquez ................. | G06Q 20/00 379/88.04 |
| 2017/0148073 A1* | 5/2017 | Nomula ............. | G06Q 30/0617 |
| 2018/0054523 A1* | 2/2018 | Zhang ................. | H04M 3/5166 |

OTHER PUBLICATIONS

Mell et al., "The NIST Definition of Cloud Computing," National Institute of Standards and Technology, U.S. Department of Commerce, Special Publication 800-145, Sep. 2011, pp. 1-7.

\* cited by examiner

Advice Schema

- Name of Virtual Agent:

- Conversation Start Time:
    2017.5.22 14:30

- User (e.g. Name, Type):

- Context (e.g. Supported Business):

- Current Issue s:

- Waiting time:

INTERVENTION IN CONVERSATION BETWEEN VIRTUAL AGENT AND USER

BACKGROUND

The present invention relates to the field of artificial intelligence, and more specifically, to a computer-implemented method, apparatus, computer program product for intervention in a conversation between a virtual agent and a user.

Conversational robot is increasingly widely used in many areas, such as customer service, product selling, information consulting, etc. to replace human being to chat with a customer. The conversational robot may be specific to a service, a product, or a company, and is provided with a specific database storing a large number of recommended responses. After a conversation is established between the conversational robot and a user, the user may send a request to the conversational robot. The conversational robot may analyze the request to identify an intent and one or more related entities of the request, and find the appropriate response from the specific database based on the identified intent and related entity/entities. Then the conversational robot may send the response to the user.

SUMMARY

According to one embodiment of the present invention, there is provided a computer-implemented method for intervention in a conversation between a virtual agent and a user. In the method, a risk level of the conversation between a virtual agent and a user is evaluated. In response to the risk level being higher than a threshold, it is indicated that the conversation needs an intervention by a human agent. In response to the human agent intervening in the conversation, the conversation is handed over from the virtual agent to the human agent. Then, a simulative conversation is generated according to the conversation between the user and the human agent. In response to a determination by the human agent based on the simulative conversation, the conversation is handed over from the human agent to the virtual agent.

According to another embodiment of the present invention, there is provided an apparatus for intervention in a conversation between a virtual agent and a user. The apparatus comprises one or more processors, a memory coupled to at least one of the processors, and a set of computer program instructions stored in the memory and executed by at least one of the processors in order to perform actions of: evaluating a risk level of the conversation between a virtual agent and a user; indicating, in response to the risk level being higher than a threshold, that the conversation needs an intervention by a human agent; handing over, in response to the human agent intervening in the conversation, the conversation from the virtual agent to the human agent; generating a simulative conversation according to the conversation between the user and the human agent; and handing over, in response to a determination by the human agent based on the simulative conversation, the conversation from the human agent to the virtual agent.

According to still another embodiment of the present invention, there is provided a computer program product. The computer program product comprises a computer readable storage medium having program instructions embodied therewith. The program instructions are executable by a device to cause the device to evaluate a risk level of a conversation between a virtual agent and a user, to indicate, in response to the risk level being higher than a threshold, that the conversation needs an intervention by a human agent, to hand over, in response to the human agent intervening in the conversation, the conversation from the virtual agent to the human agent, to generate a simulative conversation according to the conversation between the user and the human agent, and to hand over, in response to a determination by the human agent based on the simulative conversation, the conversation from the human agent to the virtual agent.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 8 shows an example of an advice schema;

DETAILED DESCRIPTION

Figure 1:
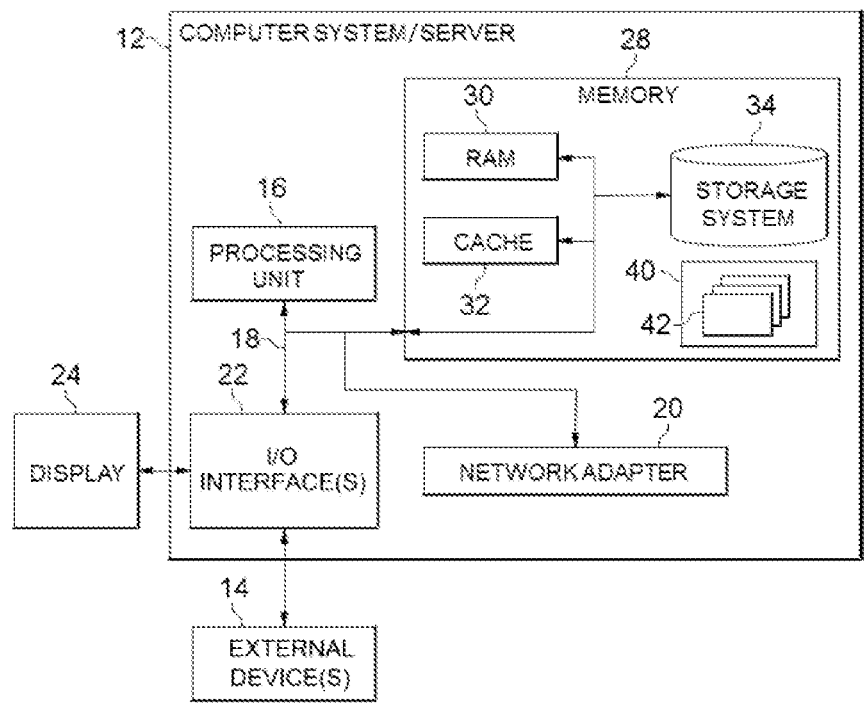
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
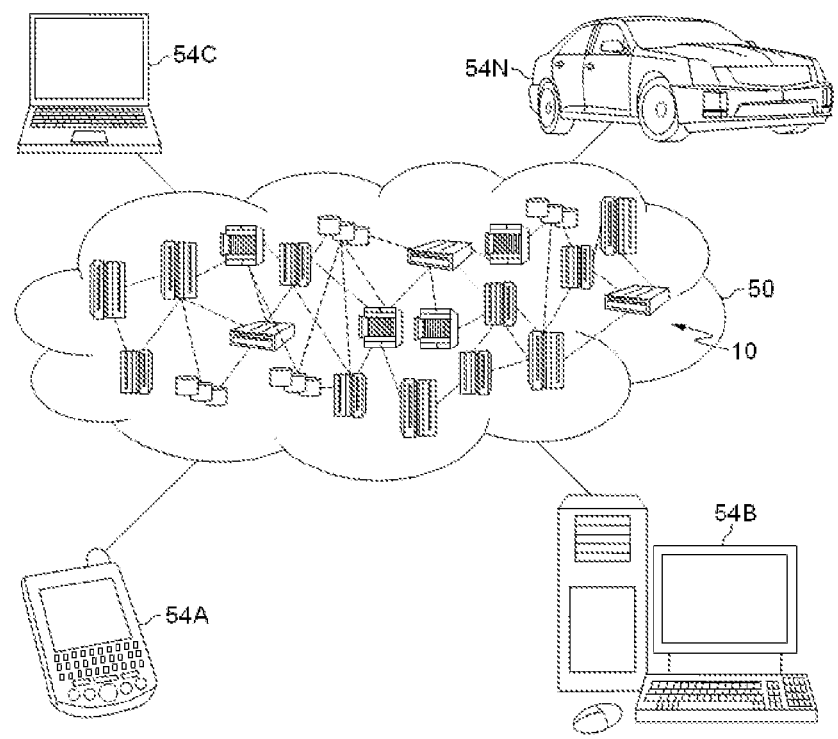
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
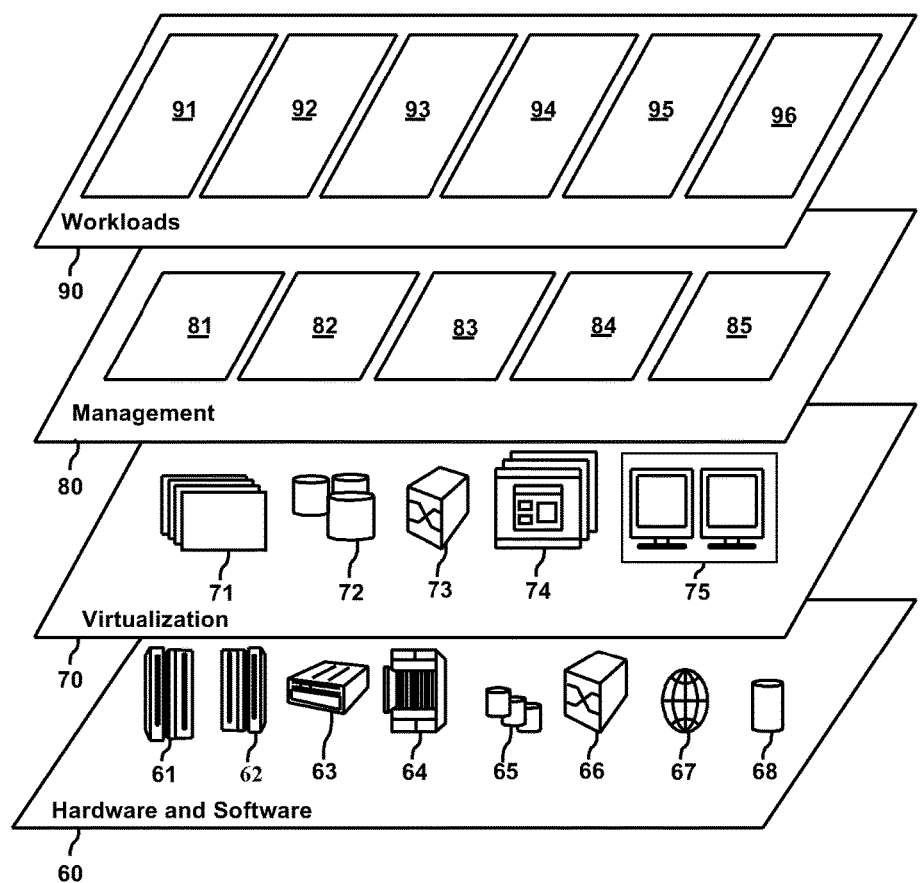
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intervention 96 in a conversation between a virtual agent and a user.

As used herein, the term "virtual agent" may refer to any virtual device which may conduct a conversation with a user, including but not limited to a conversational robot or a chatbot. The term "conversation" as used herein should be understood to include any type of text based two way communication, such as instant messaging, text messaging, or the like. Additionally, the term "conversation" as used herein should be understood to include any voice based two way communication, such as telephone conversation, automated voice system, speech to text system, or the like.

As described above, during the conversation with the user, the virtual agent must identify the user's intent so as to generate the appropriate response. However the conversational robot may not identify the intent or the entity/entities of the request or may not incorrectly identify those in some cases, and thus cannot provide the appropriate response. This may result in bad user experience. Therefore it is desirable to make a human operator (also referred to as "human agent") intervene in the conversation to improve the user experience.

Figure 4:
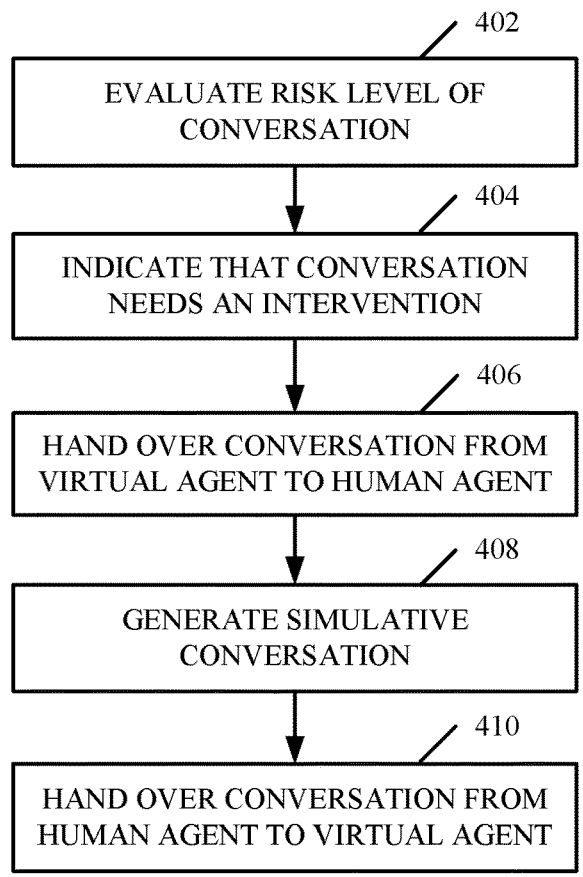
FIG. 4 depicts a schematic flowchart of a method for intervention in a conversation between a virtual agent and a user according to an embodiment of the present invention.

With reference now to FIG. 4, a schematic flowchart of a method for intervention in a conversation between a virtual agent and a user is depicted. A person skilled in the art will appreciate that the method may be implemented by any kind of computing device, such as the computer system/server 12 as shown in FIG. 1.

According to embodiments of the present invention, the method of the embodiment is to determine whether the conversation needs the human agent to intervene in based on the conversation's state, and provide related information which may facilitate the intervention of the human agent in the conversation, if the conversation needs the human agent.

As shown in FIG. 4, at block 402, the computing device may evaluate a risk level of the conversation between the virtual agent and the user. In the embodiment, the risk level may be used to indicate how necessary it is that the conversation needs the human agent to intervene in.

Figure 5:
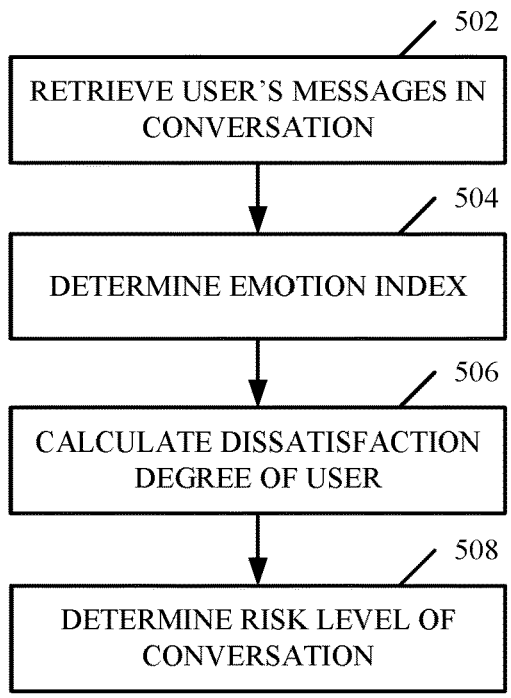
FIG. 5 depicts a schematic flowchart for illustrating an exemplary process of evaluating a risk level of the conversation in the method depicted by FIG. 4.
Figure 6:
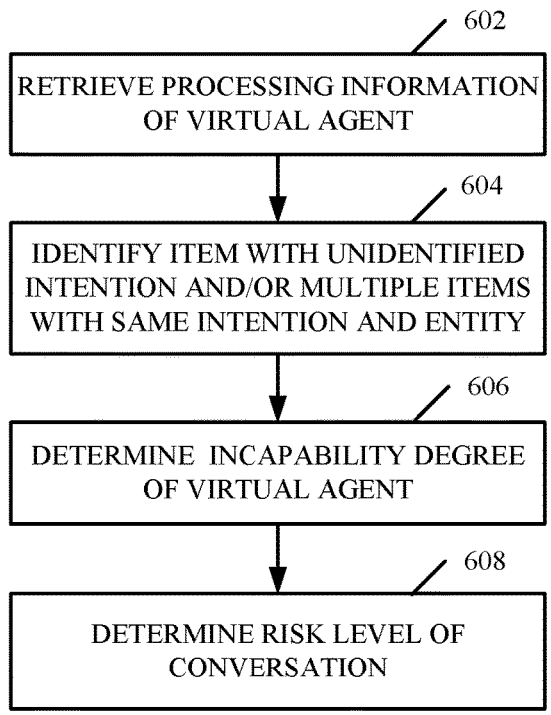
FIG. 6 depicts a schematic flowchart for illustrating another exemplary process of evaluating a risk level of the conversation in the method depicted by FIG. 4.

In some embodiments of the present invention, the risk level may be evaluated in terms of dissatisfaction of the user and/or incapability of the virtual agent. FIGS. 5, 6 illustrate two exemplary processes of evaluating the risk level of the conversation, respectively.

In the process as shown in FIG. 5, the risk level may be evaluated from the perspective of the user's dissatisfaction. The process is entered at block 502, where the computing device may retrieve user's messages in the conversation. Generally the conversation may be recorded in a log comprising both the user's messages with a time stamp and the virtual agent's messages with a time stamp.

Then the computing device may analyze a dissatisfaction degree of the user from the user's messages. In an embodiment, at block 504, the computing device may process each of the user's messages using natural language processing technique to determine an emotion index of the user's message. With the natural language processing technique, the computing device may obtain emotion related information in the user's message, such as emotion words, emotion phrases, or emoji, etc. Then the emotion index may be determined based on the emotion related information. Then, at block 506, the computing device may calculate the dissatisfaction degree based on the emotion indexes of the user's messages. In some embodiments, the dissatisfaction degree may be calculated as an average value of the emotion indexes. In some embodiment, the dissatisfaction degree may be calculated as a weighted sum of the emotion indexes. In this case, a weight of the emotion index may be dependent on the time stamp of the user's message. The later the time stamp of the user's message is, the higher the weight of the emotion index is. In this way, a trend of the user's emotion can be considered.

Then at block 508, the computing device may determine the risk level of the conversation based on the dissatisfaction degree. In some embodiments, the risk level may be determined as the dissatisfaction degree. In some embodiments, the dissatisfaction degree may be mapped to the risk level. Each risk level may cover a certain range of the dissatisfaction degree.

Alternatively, in some embodiments, the emotion index may be determined on the basis of a conversation turn. As used herein, the conversation turn may refer to a process which ends with a message from a virtual/human agent. The computing device may determine the emotion index for each conversation turn based on the user's message(s) in the conversation turn. Then the computing device may calculate the dissatisfaction degree based on these emotion indexes.

In the process as shown in FIG. 6, the risk level may be evaluated from the perspective of the incapability of the virtual agent. The process is entered at block 602, where the computing device may retrieve processing information of the virtual agent with respect to the conversation. Generally when the virtual agent receives the user's message, the virtual agent may analyze the message using the natural language processing technique to identify the user's intent and related entity/entities. Then the virtual agent may select an appropriate reference response from a set of reference responses based on the identified user's intent. The virtual agent may be preconfigured with the set of reference responses. The virtual agent may also update its conversation context with the identified entities. Then the virtual agent may generate a message based on the selected reference response and the conversation context, and send the generated message to the user. The processing of the virtual agent with respect to the user's message may be recorded to form the processing information, including the intent, the entity/entities, the selected reference response, or the like. The processing information may be represented by a log including a plurality of items. Therefore each item may indicate the intent of the user and the entity/entities with respect to the user's message. As used herein, the intent refers to what the user wants, and the entity refers to an object contained in the message and may be represented by an entity name and an instance. For example, in an express service, the intent may be checking a status of an express, and the entity may be a tracking number of the express, a destination of the express, a recipient of the express, etc. For the entity "a tracking number of an express", the entity name could be "tracking number", and the instance may be "A3099001" for example. In an airline service, the intent may be ordering an air ticket, checking status of a flight, or the like, and the entity may be a flight number, a departure date, a departure airport, a destination airport, a passenger name, a telephone number, or the like.

At block 604, the computing device may identify an item with an unidentified intent and/or multiple items with the same intent and entity/entities in the processing information. As described above, upon the receipt of the user's message, the virtual agent will identify the intent of the user from the message. If the virtual agent cannot identify the intent of the user, the item corresponding to the user's message may indicate that the intent is unidentified. In addition, if the user is not satisfied with the virtual agent's response, the user may resend the same message several times. In this case, the processing information may include multiple items indicating the same intent and entity/entities. Therefore, the item with the unidentified intent and the multiple items indicating the same intent and entity/entities may reflect the incapability of the virtual agent to handle the conversation.

Then at block 606, the computing device may determine an incapability degree of the virtual agent based on the identified items at block 604. In some embodiments, the incapability degree may be dependent on the number of the identified items. The number of the identified items may be mapped to the incapability degree. Each incapability degree may cover a range of the number of the identified items.

Then at block 608, the computing device may determine the risk level of the conversation based on the incapability degree of the virtual agent. In some embodiments, the risk level may be determined as the incapability degree. In some embodiments, the capability degree may be mapped to the risk level. Each risk level may cover a certain range of the capability degree.

In the above description, the evaluation of the risk level of the conversation may consider the dissatisfaction of the user and the incapability of the virtual agent individually. Alternatively, in some embodiments, the evaluation may consider both the dissatisfaction of the user and the incapability of the virtual agent. After calculating the dissatisfaction degree of the user at block 506 and determining the incapability degree of the virtual agent at block 606, the computing device may determine the risk level of the conversation based on both dissatisfaction degree of the user and the incapability degree of the virtual agent. In some embodiments, the dissatisfaction degree and the incapability degree may be normalized respectively. Then the risk level of the conversation may be determined as a sum of the normalized dissatisfaction degree and the normalized incapability degree. A person skilled in the art will appreciate that other combination ways of the dissatisfaction degree and the incapability degree may be used to determine the risk level.

Referring back to FIG. 4, at block 404, in response to the risk level being higher than a threshold, the computing device may indicate that the conversation needs an intervention by a human agent.

In some embodiments, the computing device may label the conversation to indicate the risk level of the conversation. For example, an icon representing the conversation may be displayed with a particular color according to the risk level. Optionally, the icon may be attached with the risk level of the conversation. Further, in some embodiments, the computing device may also determine an intervention priority of the conversation according to the risk level and a profile of the user. The profile may comprise a user name, a user type such as Ordinary User, VIP User, or VVIP User, historical satisfaction, or the like. Thus the conversation may be labeled according to the intervention priority. For example, the icon of the conversation may be displayed with different colors for different intervention priorities.

Figure 7:
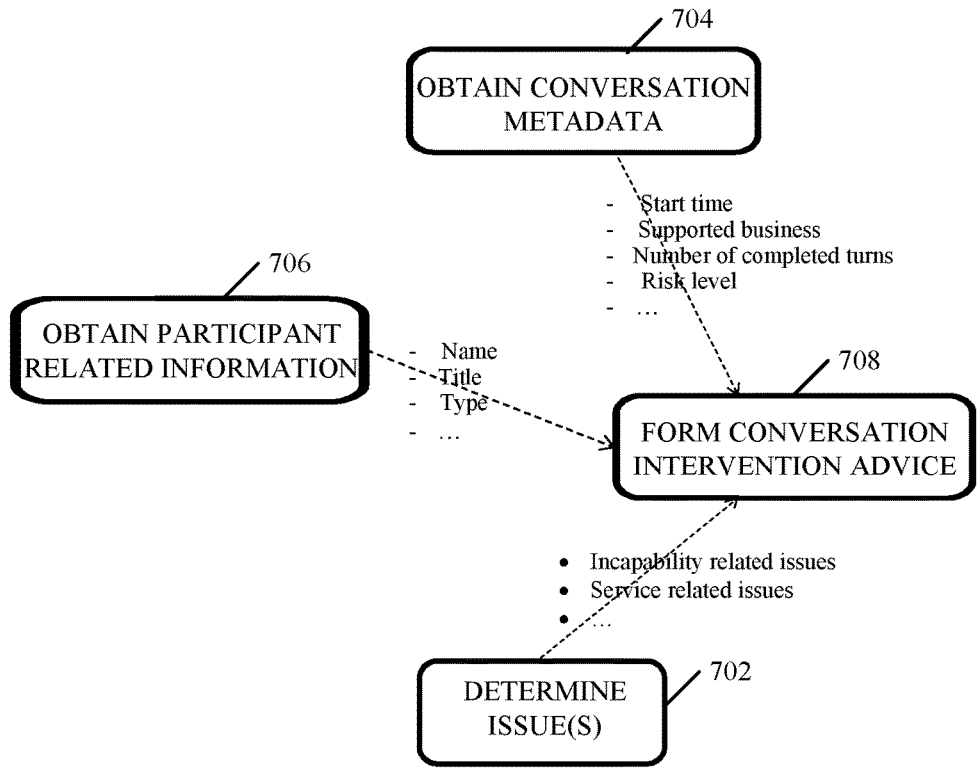
FIG. 7 illustrates generation of an conversation intervention advice.

Moreover, the computing device may also generate a conversation intervention advice according to the conversation. The conversation intervention advice may provide the conversation related information to help the human agent to catch up the conversation quickly. FIG. 7 illustrates the generation of the conversation intervention advice. In some embodiments, the computing device may analyze the processing information of the virtual agent to determine at least one issue in the conversation, at block 702. The issue may include incapability related issue of the virtual agent such as "the virtual agent cannot understand the intent of the user", service related issue such as "waiting time of the user is long". Also, the computing device may obtain conversation metadata (at block 704) and participant related information (at block 706) of the conversation. The conversation metadata may include conversation start time, supported business, number of completed conversation turn, the risk level of the conversation, etc. The participant related information may include the user name, the user type, the name of the virtual agent, or the like. Then the computing device may form the conversation intervention advice with the conversation metadata, the participant related information and the one or more issues, at block 708. In some embodiment, the conversation intervention advice may follow a predefined advice schema. FIG. 8 shows an example of the advice schema.

Referring back to FIG. 4, at block 406, the computing device may hand over the conversation from the virtual agent to the human agent, if the human agent decides to intervene in the conversation. Thereafter, the conversation continues between the human agent and the user. If the human agent does not decide to intervene in the conversation, the conversation still maintains between the virtual agent and the user. In this case, the computing device may still perform the evaluation of the risk level of the conversation when new user's message is sent.

After the human agent takes over the conversation, the human agent can reply to the user till the conversation ends. But this would result in low usage of the virtual agent and high workload of the human agent. To this end, in some embodiments, during the conversation between the human agent and the user, the computing device may cause the virtual agent to track the conversation between the human agent and the user, so that the conversation may be handed over back to the virtual agent once it is determined that the virtual agent is capable of handling the conversation.

Then at block 408, the computing device may cause the virtual agent to generate a simulative conversation according to the conversation between the user and the human agent.

Figure 9:
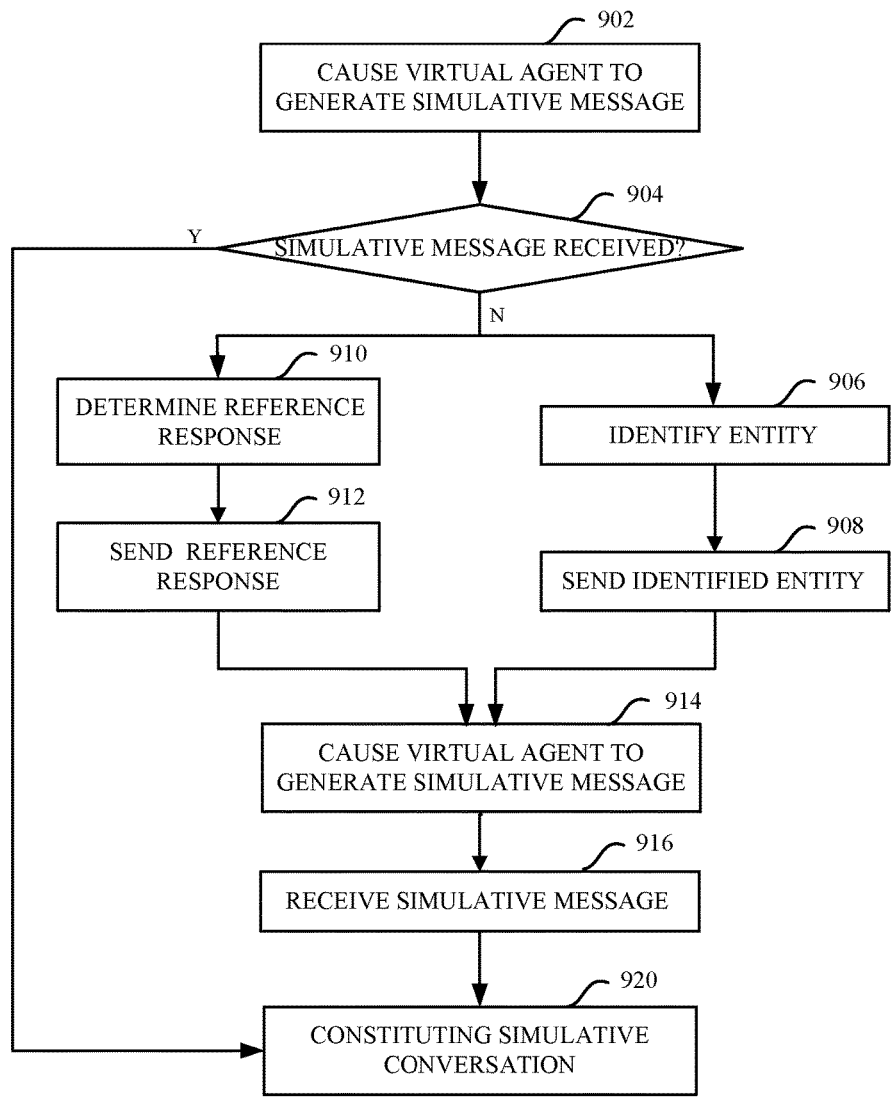
FIG. 9 depicts a schematic flowchart for illustrating an exemplary process of causing the virtual agent to generate a simulative conversation in the method depicted by FIG. 4.

FIG. 9 illustrates a schematic flowchart of the process of generating a simulative conversation. This process may be performed during the conversation between the human agent and the user.

This process may be entered at block 902, where the computing device may cause the virtual agent to generate a simulative message based on the user's message in the conversation between the user and the human agent. In some embodiments, when a conversation turn between the user and the human agent finishes, the computing device may cause the virtual agent to generate the simulative message to respond to the user's message in the conversation turn by a command. Upon receipt of the command, the virtual agent may identify the intent from the user's message. If the virtual agent identifies the intent, it may select the appropriate reference response and may generate the simulative message. If the virtual agent does not identify the intent, the virtual agent will not generate the simulative message.

At block 904, the computing device may check whether the simulative message is received from the virtual agent. In some embodiments, the computing device may check whether the simulative message is received within a predetermined duration after the command is sent. If the computing device receives the simulative message ("Y" at block 904), the simulative message may be used to constitute the simulative conversation at block 920. If the simulative message is not received within the duration ("N" at block 904), the process proceeds to block 906 and block 910.

At block 906, the computing device may identify one or more entities in the conversation turn. In some embodiments, the computing device may identify the entities from both the user's message(s) and the human agent's message in the conversation turn. As described above, the entity may be represented by the entity name and the instance. Alternatively, in some embodiments, the computing device may identify the entities from the human agent's message only, and cause the virtual agent to identify the entities from the user's message(s).

At block 908, the computing device may send the identified entities to the virtual agent, and cause the virtual agent to update the conversation context with the identified entities.

At block 910, the computing device may determine a reference response matched with the human agent's message from the set of reference responses. In some embodiments, the computing device may compare the human agent's message with each of the set of reference responses by means of Natural Language Understanding (NLU), to determine the response reference matched with the human agent's message. In an embodiment, the computing device may analyze the human agent's message by mean of the NLU, to obtain a semantic representation of the human agent's message. Also the computing device may obtain the semantic representation of each of the reference responses. Then the computing device may compare the semantics representation of the human agent's message with the semantics representation of each reference response, to determine one or more reference responses with the similar semantic representation to the human agent's message. Then the computing device may determine the reference response with the most similar semantic representation, as the matched reference response. A person skilled in the art will appreciate that the determination of the matched reference response may also be implemented in other ways.

Then at block 912, the computing device may send the matched reference response to the virtual agent, so that the virtual agent can learn the appropriate response to such user's message.

At block 914, the computing device may cause the virtual agent to generate a simulative message based on the matched reference response. In some embodiments, the virtual agent may search for the necessary information (e.g. the entities) for the matched reference response in the conversation context. If the virtual agent finds the necessary information, the virtual agent may generate a simulative message based on the matched reference response and the necessary information. Therefore the simulative message may be considered as the virtual agent's response to the user's message(s) in the conversation turn. Then the virtual agent may send the simulative message to the computing device. If the virtual agent does not find the necessary information, the virtual agent does not generate the simulative message.

At block 916, the computing device may receive the simulative message from the virtual agent. For each conversation turn of the conversation between the user and the human agent, the operations at blocks 902 to 916 as described above will be performed. Further the received simulative message(s) may constitute the simulative conversation at block 920. Alternatively, the simulative conversation may include, in addition to the simulative message, the user's message(s) corresponding to the simulative message. The simulative conversation may be presented to the human agent via a display interface.

Then the human agent may determine whether to hand over the conversation to the virtual agent based on the simulative conversation. If the human agent determines to hand over the conversation to the virtual agent, the computing device may hand over the conversation from the human agent to the virtual agent, at block 410.

It can be seen from the above description that the method for intervention in the conversation between the virtual agent and the user can provide the conversation related information to help the human agent when the conversation needs the human agent to intervene, and can hand over the conversation between the virtual agent and the human agent to improve the usage of the virtual agent and leverage the workload of the human agent.

Figure 10:
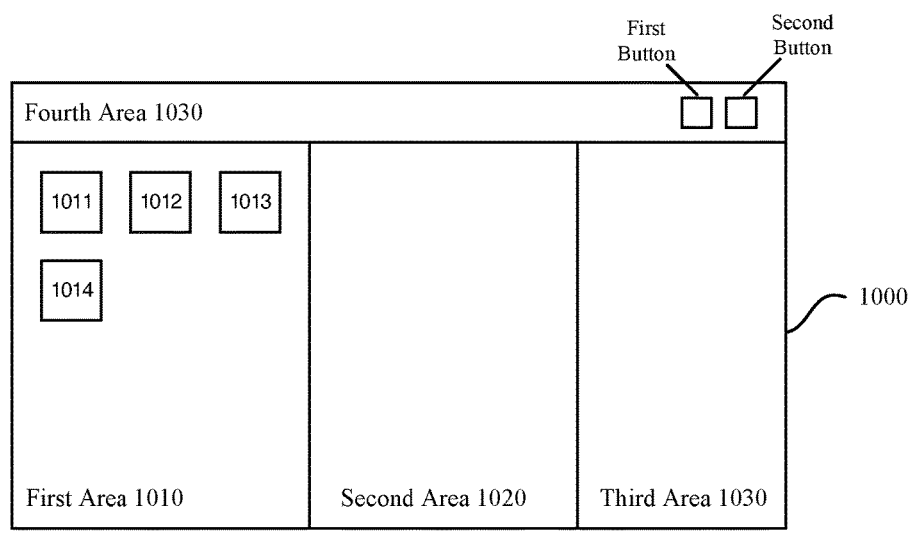
FIG. 10 illustrates an exemplary display interface for the conversation intervention according to the embodiments of the present invention.

FIG. 10 shows an example of a display interface 1000 for the conversation intervention according to the embodiments of the present invention. In this example, the conversation may be the text based communication. As shown in FIG. 10, the display interface 1000 may be divided into multiple areas (in this example, four areas, i.e. a first area 1010, a second area 1020, a third area 1030, and a fourth area 1040). The first area 1010 may be configured to show at least one icon of the conversation with the risk level higher than the threshold. In this example, four icons 1011, 1012, 1013 and 1014 are showed, which means there are four conversations which need the intervention. The second area 1020 may be configured to display the intervened conversation. In the second area 1020, an input interface may be provided for the human agent to input his/her message. The third area 1030 may be configured to display the conversation intervention advice for the intervened conversation and/or one or more reference response to the current user's message. The fourth area 1040 may be configured to display other information or control button, including but not limited to the conversation metadata, the participant related information, a first button configured to control the handover of the conversation from the virtual agent to the human agent, or a second button configured to control the handover of the conversation from the human agent to the virtual agent.

A person skilled in the art will appreciate that the display interface may be arranged in other ways.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method to improve the usage of the virtual agent for intervention in a conversation between a virtual agent and a user, the method comprising:
    evaluating, by a computing device, a risk level of the conversation between the virtual agent and the user, wherein evaluating the risk level of the conversation between the virtual agent and the user comprises:
      retrieving messages of the user in the conversation;
      analyzing a dissatisfaction degree of the user from the messages using a natural language processing technique; and
      determining the risk level of the conversation based on the dissatisfaction degree;
    based on indicating, in response to the risk level being higher than a threshold, that the conversation needs an intervention by a human agent, displaying an icon representing the conversation with a particular color according to the risk level;
    handing over, in response to the human agent intervening in the conversation, the conversation from the virtual agent to the human agent;
    generating a simulative conversation according to the conversation between the user and the human agent; and handing over, in response to a determination by the human agent based on the simulative conversation, the conversation from the human agent to the virtual agent.

2. The method according to claim 1, wherein evaluating the risk level of the conversation between the virtual agent and the user further comprises:
   retrieving processing information of the virtual agent with respect to the conversation, wherein the processing information comprises at least one item indicating an intent and at least one entity with respect to a message of the user;
   identifying an item with an unidentified intent and multiple items with the same intent and entity in the processing information;
   determining an incapability degree of the virtual agent based on the identified items; and
   determining the risk level of the conversation based on the incapability degree.

3. The method according to claim 2, wherein evaluating the risk level of the conversation between the virtual agent and the user further comprises:
   retrieving messages of the user in the conversation; and
   analyzing a dissatisfaction degree of the user from the messages of the user;
   wherein the risk level of the conversation is determined based on the dissatisfaction degree of the user and the incapability degree of the virtual agent.

4. The method according to claim 1, wherein indicating, in response to the risk level being higher than a threshold, that the conversation needs an intervention by a human agent further comprises:
   labeling the conversation;
   generating a conversation intervention advice according to the conversation; and
   presenting the labeled conversation and the conversation intervention advice.

5. The method according to claim 4, wherein indicating, in response to the risk level being higher than a threshold, that the conversation needs an intervention by a human agent further comprises:
   determining an intervention priority of the conversation according to a profile of the user and the risk level;
   wherein the conversation is labeled according to the intervention priority.

6. The method according to claim 4, wherein generating the conversation intervention advice comprises:
   analyzing processing information of the virtual agent with respect to the conversation to determine at least one issue;
   obtaining conversation metadata and participant related information of the conversation; and
   forming the conversation intervention advice with the conversation metadata, the participant related information and the at least one issue.

7. The method according to claim 1, wherein generating a simulative conversation according to the conversation between the user and the human agent comprises:
   causing the virtual agent to generate a simulative message based on the message of the user in the conversation between the user and the human agent;
   checking whether the simulative message is received from the virtual agent;
   in response to the simulative message being not received:
      identifying an entity in the conversation between the user and the human agent;
      providing the identified entity to the virtual agent;
      determining a reference response matched with the human agent's message from a set of reference responses predefined for the virtual agent;
      causing the virtual agent to generate a simulative message based on the matched reference response; and
      receiving the simulative message from the virtual agent, wherein the simulative conversation comprises at least one simulative message.

8. An apparatus to improve the usage of the virtual agent for intervention in a conversation between a virtual agent and a user, the apparatus comprising:
   one or more processors;
   a memory coupled to at least one of the processors;
   a set of computer program instructions stored in the memory and executed by at least one of the processors in order to perform actions of:
   evaluating, by a computing device, a risk level of the conversation between the virtual agent and the user, wherein evaluating the risk level of the conversation between the virtual agent and the user comprises:
      retrieving messages of the user in the conversation;
      analyzing a dissatisfaction degree of the user from the messages using a natural language processing technique; and
      determining the risk level of the conversation based on the dissatisfaction degree;
   based on indicating, in response to the risk level being higher than a threshold, that the conversation needs an intervention by a human agent, displaying an icon representing the conversation with a particular color according to the risk level;
   handing over, in response to the human agent intervening in the conversation, the conversation from the virtual agent to the human agent;
   generating a simulative conversation according to the conversation between the user and the human agent; and
   handing over, in response to a determination by the human agent based on the simulative conversation, the conversation from the human agent to the virtual agent.

9. The apparatus according to claim 8, wherein the set of computer program instructions is executed by at least one of the processors in order to evaluate a risk level of a conversation between a virtual agent and a user by:
   retrieving messages of the user in the conversation;
   analyzing a dissatisfaction degree of the user from the messages of the user; and
   determining the risk level of the conversation based on the dissatisfaction degree.

10. The apparatus according to claim 8, wherein the set of computer program instructions is executed by at least one of the processors in order to evaluate a risk level of a conversation between a virtual agent and a user by:
   retrieving processing information of the virtual agent with respect to the conversation, wherein the processing information comprises at least one item indicating an intent and at least one entity with respect to a message of the user;
   identifying an item with an unidentified intent and/or multiple items with the same intent and entity in the processing information;
   determining an incapability degree of the virtual agent based on the identified items; and
   determining the risk level of the conversation based on the incapability degree.

11. The apparatus according to claim 10, wherein the set of computer program instructions is executed by at least one of the processors in order to evaluate a risk level of a conversation between a virtual agent and a user further by:
  retrieving messages of the user in the conversation; and
  analyzing a dissatisfaction degree of the user from the messages of the user;
  wherein the risk level of the conversation is determined based on the dissatisfaction degree of the user and the incapability degree of the virtual agent.

12. The apparatus according to claim 8, wherein the set of computer program instructions is executed by at least one of the processors in order to indicate, in response to the risk level being higher than a threshold, that the conversation needs an intervention by a human agent by:
  labeling the conversation;
  generating a conversation intervention advice according to the conversation; and
  presenting the labeled conversation and the conversation intervention advice.

13. The apparatus according to claim 12, wherein the set of computer program instructions is executed by at least one of the processors in order to indicate, in response to the risk level being higher than a threshold, that the conversation needs an intervention by a human agent further by:
  determining an intervention priority of the conversation according to a profile of the user and the risk level, wherein the conversation is labeled according to the intervention priority.

14. The apparatus according to claim 12, wherein the set of computer program instructions is executed by at least one of the processors in order to generate a conversation intervention advice according to the conversation by:
  analyzing processing information of the virtual agent with respect to the conversation to determine at least one issue;
  obtaining conversation metadata and participant related information of the conversation; and
  forming the conversation intervention advice with the conversation metadata, the participant related information and the at least one issue.

15. The apparatus according to claim 8, wherein the set of computer program instructions is executed by at least one of the processors in order to generate a simulative conversation according to the conversation between the user and the human agent by:
  causing the virtual agent to generate a simulative message based on the message of the user in the conversation between the user and the human agent;
  checking whether the simulative message is received from the virtual agent;
  in response to the simulative message being not received:
    identifying an entity in the conversation between the user and the human agent;
    providing the identified entity to the virtual agent;
    determining a reference response matched with the human agent's message from a set of reference responses predefined for the virtual agent;
    causing the virtual agent to generate a simulative message based on the matched reference response; and
    receiving the simulative message from the virtual agent, wherein the simulative conversation comprises at least one simulative message.

16. A non-transitory computer program product to improve the usage of the virtual agent for intervention in a conversation between a virtual agent and a user comprising a computer readable storage medium having program instructions embodied therewith, the program instructions executable by a device to cause the device to:
  evaluate a risk level of the conversation between the virtual agent and the user, wherein evaluate the risk level of the conversation between the virtual agent and the user comprises:
    retrieve messages of the user in the conversation;
    analyze a dissatisfaction degree of the user from the messages using a natural language processing technique; and
    determine the risk level of the conversation based on the dissatisfaction degree;
  based on indication, in response to the risk level being higher than a threshold, that the conversation needs an intervention by a human agent, display an icon representing the conversation with a particular color according to the risk level;
  hand over, in response to the human agent intervening in the conversation, the conversation from the virtual agent to the human agent;
  generate a simulative conversation according to the conversation between the user and the human agent; and
  hand over, in response to a determination by the human agent based on the simulative conversation, the conversation from the human agent to the virtual agent.

* * * * *